United States Patent
Kim et al.

(10) Patent No.: US 7,688,847 B2
(45) Date of Patent: Mar. 30, 2010

(54) EXPECTED CHANNEL OCCUPANCY TIME AS A WIRELESS LINK METRIC

(75) Inventors: Seongkwan Kim, Seoul (KR); Sung-Ju Lee, Los Altos, CA (US); Sunghyun Choi, Seoul (KR)

(73) Assignees: Hewlett-Packard Development Company, L.P., Houston, TX (US); Seoul National University (KR)

( * ) Notice: Subject to any disclaimer, the term of this patent is extended or adjusted under 35 U.S.C. 154(b) by 346 days.

(21) Appl. No.: 11/590,555

(22) Filed: Oct. 31, 2006

(65) Prior Publication Data

US 2008/0101332 A1  May 1, 2008

(51) Int. Cl.
*H04L 12/413* (2006.01)
(52) U.S. Cl. .................. 370/448; 370/445; 370/447
(58) Field of Classification Search ............. 370/252, 370/255, 338, 350, 395.31, 400, 445, 456–459, 370/447, 448; 455/1, 445, 450, 452.2, 453, 455/455–456.4, 509, 513, 516
See application file for complete search history.

(56) References Cited

U.S. PATENT DOCUMENTS

| 6,640,087 | B2 * | 10/2003 | Reed et al. ................. 455/11.1 |
| 6,920,121 | B2 * | 7/2005 | Tan ............................ 370/329 |
| 7,330,457 | B2 * | 2/2008 | Panwar et al. ............... 370/338 |
| 2004/0032847 | A1 * | 2/2004 | Cain ........................... 370/338 |

OTHER PUBLICATIONS

Aguayo, D. et al., "Link-Levl Measurements from an 802.11b Mesh Network", SIGCOMM'04, ACM Aug. 30-Sep. 3, 2004.
Akyildiz, I.F. et al., "Wireless Mesh Networks: A Survey", Computer Networks 2004.
Awerbuch, B. et al., "High Throughput Route Selection in Multi-Rate Ad Hoc Wireless Networks", downloaded Oct. 30, 2006.
Awerbuch, B. et al., "The Medium Time Metric: High Throughput Route Selection in Multi-Rate Ad Hoc Wireless Networks", ACM, Technical Report Oct. 2004.
Bahl, P. et al., "Reconsidering Wireless Systems with Multiple Radios", downloaded Oct. 30, 2006.
Bruno, R. et al., "Mesh Networks: Commodity Multihop Ad Hoc Networks", IEEE Communications Magazine, Mar. 2005.
Bicket, J. et al., "Architecture and Evaluation of an Unplanned 802.11b Mesh Network", ACM, MobiCom '05, Aug. 28-Sep. 2, 2005.
De Couto, D. S.J. et al., "A High-Throughput Path Metric for Multi-Hop Wireless Routing", ACM, MobiCom '03, Sep. 14-19, 2003.

(Continued)

*Primary Examiner*—Nick Corsaro
*Assistant Examiner*—Amanuel Lebassi

(57) ABSTRACT

Expected channel occupancy time is a wireless link metric determined based on a transmission protocol to be used for transmitting data in a wireless network. The wireless link metric may be used for routing or other network management functions. For determining the wireless link metric, an overhead is determined for one or more of accessing and releasing a channel to transmit a burst, including at least one frame, in the wireless network using the transmission protocol. An expected burst transmission time is calculated based at least on the overhead. The expected channel occupancy time is determined from the expected burst transmission time and an estimation of a number of frames to be successfully delivered during the burst.

19 Claims, 7 Drawing Sheets

OTHER PUBLICATIONS

De Couto, D. S.J. et al., "Performance of Multihop Wireless Networks: Shortest Path is Not Enough", downloaded Oct. 30, 2006.
Draves, R. et al., "Comparison of Routing Metrics for Static Multi-Hop Wireless Networks", ACM, SIGCOMM'04, Aug. 30-Sep. 3, 2004.
Draves, R. et al., "Routing in Multi-Radio, Multi-Hop Wireless Mesh Networks", ACM, MOBICOM'04, Sep. 26-Oct. 1, 2004.
Holland, G. et al., "A Rate-Adaptive MAC Protocal for Multi-Hop Wireless Networks", ACM/IEEE, MOBICOM '01, Jul. 2001.
Kim, J. et al., "CARA: Collision-Aware Rate Adaptation for IEEE 802.11 WLANs", downloaded Oct. 30, 2006.
Kyasanur, P. et al., "Multi-Channel Mesh Networks: Challenges and Protocals", downloaded Oct. 30, 2006.
Kyasanur, P. et al., "Routing in Multi-Channel Multi-Interface Ad Hoc Wireless Networks", Technical Report, Dec. 2004.
Qiao, D. et al., "Goodput Enhancement of IEEE 802.11a Wireless LAN via Link Adaptation", downloaded Oct. 30, 2006.
Qiao, D. et al., "MiSer: An Optimal Low-Energy Transmission Strategy for IEEE 802.11a/h", AKM, MOBICOM '03, Sep. 14-19, 2003.
Raniwala, A. et al., "Architecture and Algorithms for an IEEE 802.11 Based Multi-Channel Wireless Mesh Network", downloaded Oct. 30, 2006.
Yang, Y. et al., "Designing Routing Metrics for Mesh Networks", downloaded Oct. 30, 2006.
Yang, Y. et al., "Interference-Aware Load Balancing for Multihop Wireless Networks", downloaded Oct. 30, 2006.
Zhao, S. et al., "PARMA: A PHY/MAC Aware Routing Metric for Ad-Hoc Wireless Networks with Multi-Rate Radios", downloaded Oct. 30, 2006.
Zhou, W. et al., "Comparative Study of Routing Metrics for Multi-Radio Multi-Channel Wireless Networks", downloaded Oct. 30, 2006.
Seattle Wireless, http://www.seattlewireless.net/, downloaded Oct. 30, 2006.
MIT Roofnet, http://pdos.csail.mit.edu/roofnet/, downloaded Oct. 30, 2006.
MSR: Self-Organizing Neighborhood Wireless Mesh Networks, http://research.microsoft.com/mesh/, downloaded Oct. 30, 2006.
Mesh Dynamics, http://www.meshdynamics.com/,downloaded Oct. 30, 2006.
Tropos Networks, http://www.tropos.com, downloaded Oct. 30, 2006.
Champaign-Urbana Community Wireless Network, http://www.cuwireless.net/, downloaded Oct. 30, 2006.
The Network Simulator, http://www.isi.edu/nsnam/ns/, downloaded Oct. 30, 2006.

* cited by examiner $$O_A = tRTS + SIFS + tCTS + (2 * O_{PHY})$$

$$O_R = 0$$

$$U = tMPDU + (2 * SIFS) + tACK + (2 * O_{PHY})$$

$$EBTT = DIFS + tBO + O_A + U + O_R$$

$$O_A = tRTS + SIFS + tCTS + (2 * O_{PHY})$$

$$O_R = 0$$

$$U = tMPDU + (2 * SIFS) + tACK + (2 * O_{PHY})$$

$$EBTT = DIFS + tBO + O_A + \left(\sum_{n=0}^{N-1}(n+1)*P(n) + N*P(N)\right)*U + O_R$$

$$O_A = tRTS + SIFS + tCTS + (2 * O_{PHY})$$

$$O_R = tBREQ + 2 * SIFS + tBACK + 2 * O_{PHY}$$

$$U = tMPDU + SIFS + O_{PHY}$$

$$EBTT = DIFS + tBO + O_A + N * U + O_R$$

EXPECTED CHANNEL OCCUPANCY TIME AS A WIRELESS LINK METRIC

BACKGROUND

Wireless mesh networks (WMNs) are emerging as attractive solutions for last-mile broadband Internet access. A wireless mesh network is generally composed of wireless clients, a gateway portal that connects the mesh network to the Internet, and mesh nodes that form the backbone. The mesh nodes wirelessly communicate with each other to provide Internet connectivity for the clients. Routes between the mesh nodes could be multihop. For example, typically paths between clients and the gateway portal via the mesh nodes are multihop.

Conventional medium access control (MAC) protocols, such as 802.11 protocols and other conventional wireless protocols for transmitting data in a WMN tend to have different channel overhead. Metrics for selecting routing paths impact the resulting quality and capacity of paths in a WMN. However, conventional shortest-hop metrics used for routing, such as latency or number of hops, typically do not consider the channel overhead of the protocol to be used for transmitting data in the WMN and also typically do not consider the transmission rate of the links in the WMN, which have a significant impact on channel capacity. Accordingly, the conventional shortest-hop metrics may not provide for efficient routing to optimize bandwidth in mutihop networks where transmission rate and the type of protocol being used may impact bandwidth.

BRIEF DESCRIPTION OF THE DRAWINGS

Various features of the embodiments can be better appreciated, at the same time become better understood with reference to the following detailed description when considered in connection with the accompanying figures, in which.

DETAILED DESCRIPTION OF THE EMBODIMENTS

In the following detailed description, references are made to the accompanying figures, which illustrate specific embodiments. Electrical, mechanical, logical and structural changes may be made to the embodiments without departing from the spirit and scope of the embodiments.

Figure 1:
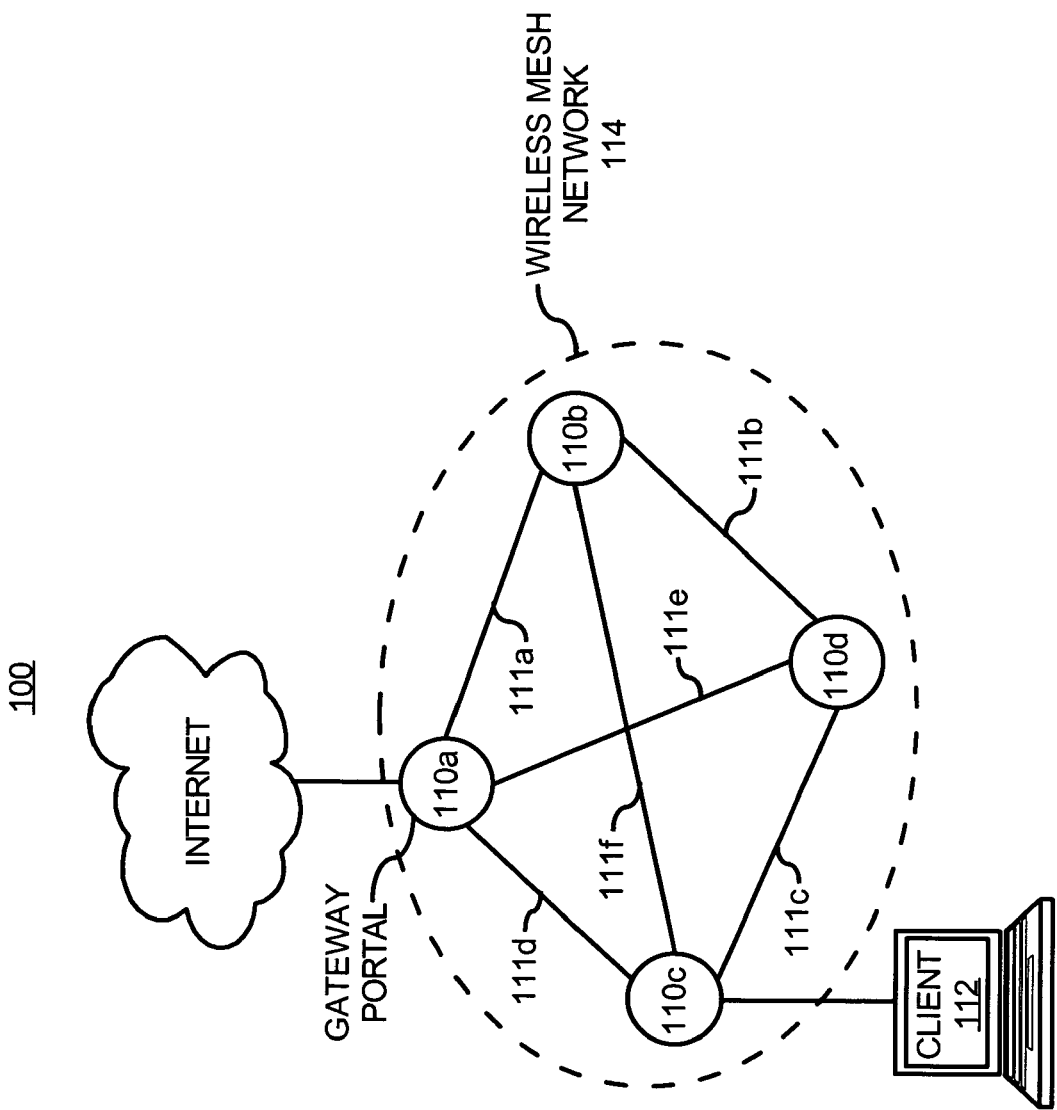
FIG. 1 illustrates a system including a WMN, according to an embodiment.

FIG. 1 illustrates a system 100 according to an embodiment. The system 100 comprises a WMN 114 connected to the Internet. The WMN 114 includes mesh nodes 110a-d that form the backbone for the WMN 114 and provide connectivity to the Internet for clients, such as the client 112. The mesh nodes 110a-d communicate with each other on a shared, broadcast wireless medium, and routes between them could be multihop. The wireless medium may be a single channel medium, so there is contention when trying to access the channel to transmit data. Each mesh node has at least one interface for communicating with other mesh nodes using a wireless transmission protocol. The interface may use a transmission protocol comprising a multihop, medium access control (MAC) protocol for transmitting data in the WMN 114. Examples of MAC protocols that may be used for transmitting data in the WMN 114 include IEEE 802.11 standards, such as 802.11a,b,e,g,n. The 802.11 standards may include MAC layer standards, such as Distributed Coordination Function (DCF) based on Carrier Sense Multiple Access with Collision Avoidance (CSMA/CA), which is specified as a mandatory medium access scheme for 802.11. For 802.11e, Enhanced Distributed Channel Access (EDCA) and EDCA with Block ACK enhance DCF by providing differentiated and distributed channel accesses for frames with different user priorities. 802.11n uses A-MPDU aggregation to aggregate MAC Protocol Data Units (MPDUs). These 802.11 standards are described in further detail below and are some examples of protocols that may be used for transmitting data in the WMN 114 between mesh nodes. Other known wireless protocols may also be used.

In addition to the interface for communicating with other mesh nodes, mesh nodes may have a second interface for communicating with clients. A third interface may also be provided for communicating with a wired network. For example, at least one of the mesh nodes, such as the mesh node 110a, may be a gateway portal connecting the WMN 114 to the Internet. The mesh node 110a may be connected to a wired network that is connected to the Internet.

The mesh nodes 110a-d are typically routers or access points that are not mobile. However, the mesh nodes are generally a computer system with routing capability for routing data in the WMN 114.

Clients are connected to the WMN 114, for example, to get access to the Internet. FIG. 1 shows the client 112 connected to the mesh node 110c. A client may be a user device, such as a laptop, desktop, personal digital assistant, cellular phone, or other types of computer systems, including servers.

The WMN 114 possibly provides multiple end-to-end paths, which may be multihop, for sending or receiving client data. For example, data from the client 112 may traverse nodes 110c and 110a via link 111d in one end-to-end path or may traverse nodes 110c, 110d and 110a via links 111c and 111e in another end-to-end path. Other end-to-end paths are also possible. Typically paths between mesh nodes in a WMN are multihop, however, there may be situations where there is only one hop in a path.

The mesh nodes 110a-d use a wireless transmission medium to transmit data in the WMN 114. The wireless medium may be a single channel. Thus, there is contention and interference between mesh nodes and links in the WMN 114. The mesh nodes 110a-d may use broadcast or unicast when transmitting data. Unicasting data to a particular destination mesh node may include transmitting data on the medium with a destination address of the destination mesh node. The destination mesh node responds with an acknowledgement (ACK) if the data is received. Broadcasting may include transmitting data on the medium to many destinations, but receivers do not respond with an ACK to the sender for broadcast.

As described above, there may be multiple end-to-end paths between the client 112 and the mesh node 110a. Each path may include one or more links 110*a-f*. A link represents a path for data transmission between two mesh nodes, such as a sender and a receiver. The links are logical links and not physical links representing different channels. That is, if the wireless transmission medium is a single channel, then a logical link represents a path between the sender and the receiver when the sender gains access to the medium, whereby channel contention rules may be based on the MAC protocol used by the mesh nodes 110*a-d*. A channel in an 802.11 MAC protocol is a predetermined range of frequencies.

It will be apparent to one of ordinary skill in the art that the size of the WMN, in terms of number of mesh nodes or in terms of another metric, and the number of clients connected to the WMN may vary from shown in FIG. 1, and the embodiments described herein may be practiced in WMNs of different sizes or in other types of wireless networks.

According to an embodiment, a wireless link metric, referred to as expected channel occupancy time (ECOT), is determined and may be used for routing in the WMN 114. ECOT is a metric that takes into consideration MAC layer features of the particular MAC protocol being used, and also takes into consideration the variable transmission rate of links between mesh nodes. Although a single channel may be used in the WMN 114, transmission rates for different links may vary due to interference, carrier sensing and other known factors. The transmission rates may be changed by the sender. MAC layer features, such as channel access overhead, channel release overhead, physical layer overhead, and others may be considered when calculating ECOT to provide an accurate estimation of channel occupancy time for transmitting a frame between mesh nodes. This accurate estimation of channel occupancy time may in turn be used to estimate throughput for links in the WMN 114 and may be used for selecting links having the highest throughput for routing. Throughput is the bytes received by the receiver. Routing is a primary concern in WMNs in that most of the transmissions are multihop. Accordingly, ECOT may be used to improve the efficiency of WMNs.

ECOT is the expected channel occupancy time for transmitting data using a particular wireless transmission protocol, which may be a MAC protocol that determines which node is allowed to access the wireless transmission medium at any one time. According to an embodiment, ECOT is a function of expected burst transmission time (EBTT) and an estimation of a number of frames to be successfully delivered during the burst. A burst is a transmission of data, including channel overhead, such as channel access and/or release overhead, and one or more frames. The overhead and the number of frames transmitted in a burst vary depending on the protocol being used, so ECOT is a protocol-specific metric. A frame may be defined by the protocol. A frame may include data packets carrying the data transmitted from the sender to the receiver and frame overhead. A frame in 802.11 is a MAC Protocol Data Unit (MPDU), and a packet is used to describe a network layer protocol data unit. A frame includes one or more data packets carrying the sender's data and control packets for the frame overhead in 802.11.

Equation 1 describes a function for calculating ECOT, according to an embodiment.

$$ECOT = \frac{EBTT}{E[n]} \quad \text{Equation 1}$$

EBTT is the expected burst transmission time and E[n] is an estimation of an average number of frames to be successfully delivered during the burst. E[n] may be based on a probability P(n) of successfully delivering n frames in a burst where 0<n<N. N is the number of frames that a protocol transmits in a burst, which may be 1 or greater than 1 based on the protocol. Equation 2 described E[n] as follows:

$$E[n] = \sum_{n=0}^{N} n \cdot P(n), \quad \text{Equation 2}$$

P(n) varies depending on the protocol being used, and examples of P(n) are described below with respect to different protocols.

Examples of equations for describing EBTT with respect to different MAC protocols are also described below. First a description of the MAC protocols is provided and then EBTT is described with respect to each MAC protocol. One example of a MAC protocol that may be used in the WMN 114 is 802.11 DCF. Using this MAC protocol, when a mesh node transmits a frame, it checks the status of the channel. If the channel is busy, it waits until the end of the ongoing transmission. This makes 802.11 DCF a CSMA protocol. When the channel becomes idle, instead of transmitting immediately, the transmitter selects a random backoff interval to reduce the collision probability. This makes 802.11 DCF a collision avoidance protocol. If a frame is successfully received, the receiver responds with an ACK frame, after a Short Inter-Frame Space (SIFS) time interval. It is only after receiving an ACK frame correctly that the transmitter assumes a successful delivery of the corresponding data frame. Such an ACK is referred to as an immediate ACK, which is to be differentiated from Block ACK (BACK) specified in IEEE 802.11e and IEEE 802.11n standards, described below. If an ACK frame is received in error or no ACK frame is received, the transmitter assumes a failure of the corresponding data frame transmission.

Figure 2:
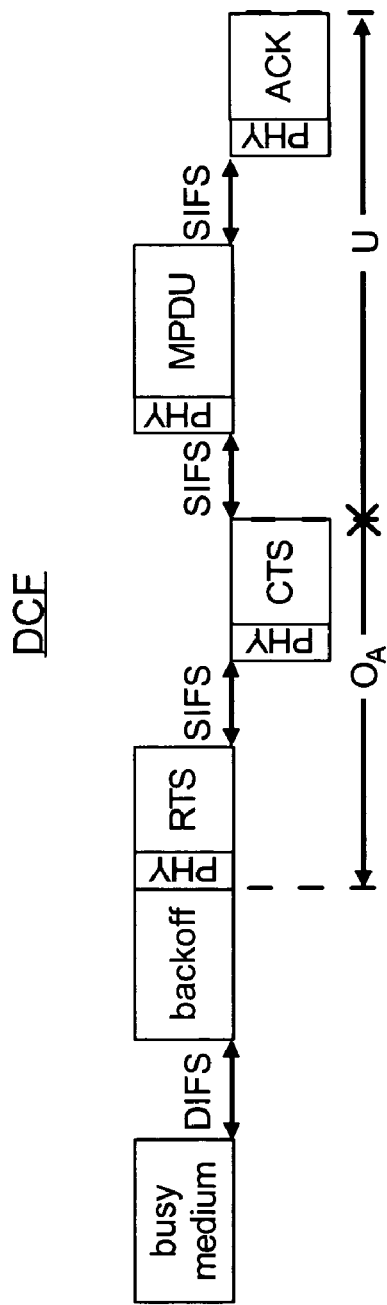
FIG. 2 illustrates a sequence of exchanges for 802.11 Distributed Coordination Function (DCF), according to an embodiment.

FIG. 2 illustrates frame exchange sequences using 802.11 DCF. In FIG. 2 and other figures described below, $O_A$ is the channel access overhead for the protocol. $O_R$ is the channel release overhead for the protocol, and U is the amount of time to transmit a single frame on the channel. $O_A$, $O_R$ and U may be in terms of time and may be based on the transmission rate of the link between two nodes. As shown in FIG. 2 and in equation 3-5 below, $O_A$, $O_R$ and U may be calculated as follows:

$$O_A = tRTS + SIFS + tCTS + (2*O_{PHY}) \quad \text{Equation 3}$$

$$O_R = 0 \quad \text{Equation 4}$$

$$U = tMPDU + (2*SIFS) + tACK + (2*O_{PHY}) \quad \text{Equation 5}$$

In equations 3-5, tRTS, tCTS, tMPDU, and TACK are the amount of time to send an RTS packet, a CTS packet, an MPDU, and an ACK, respectively. $O_{PHY}$ is the amount of time to send the physical layer overhead. EBTT for 802.11 DCF is described in equation 6 as follows:

$$EBTT = DIFS + tBO + O_A + U + O_R \quad \text{Equation 6}$$

In equation 6 and for other protocols, tBO is the amount of backoff time. tBO may be an average backoff time. It is shown that EBTT is a function of channel overhead, transmission rate, backoff time, and amount of time to transmit a frame.

As shown in FIG. 2, for 802.11 DCF, a frame exchange sequence begins with an RTS/CTS exchange used to mitigate the hidden/exposed node problems. The SIFS, which is the smallest time interval used between two consecutive frame transmissions, is used within this four-way—RTS-CTS-data-ACK—handshake. The PHY is the physical layer overhead and the MPDU is the data and control packets in the frame. Control packets may be used to carry channel overhead for this MAC and other MAC protocols. Also, some channel overhead may include frame space, such as SIFS. Before the channel is accessed, such as before the RTS/CTS exchange, the channel may be busy and a backoff time is used to avoid collision on the busy medium and to ultimately access the busy medium. DIFS is DCF interframe space. It should be noted that a burst in DCF includes a single frame, while a burst in the MAC protocols described below may include multiple frames transmitted within a predetermined time limit, referred to as Transmission Opportunity (TXOP) and tTXOP.

Figure 3:
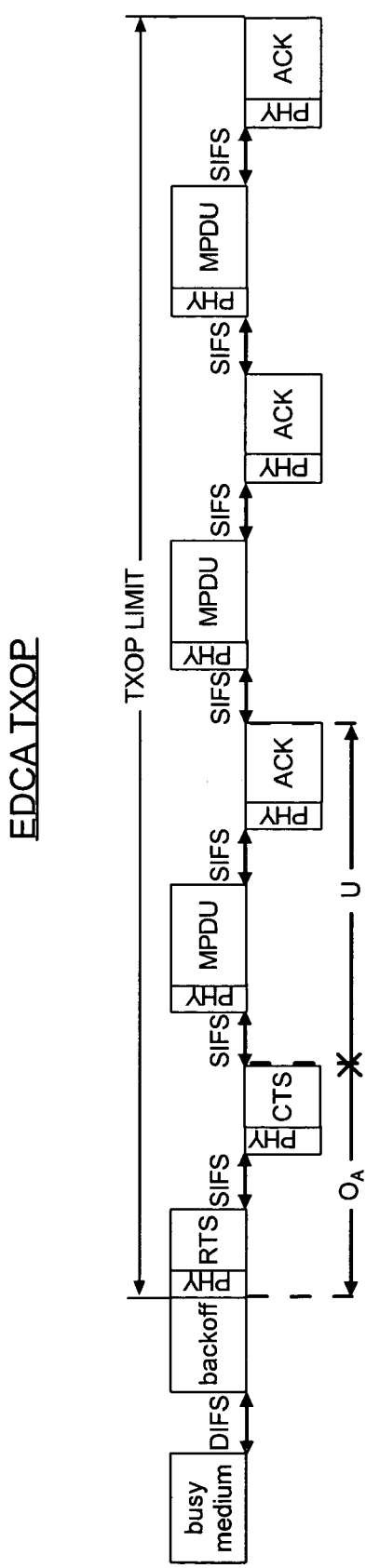
FIG. 3 illustrates a sequence of exchanges for 802.11 Enhanced Distributed Channel Access (EDCA), according to an embodiment.

FIG. 3 illustrates frame exchange sequences using another MAC protocol, 802.11e Enhanced Distributed Channel Access (EDCA) TXOP. 802.11e EDCA enhances the DCF protocol shown in FIG. 2 by providing differentiated and distributed channel accesses for frames with different user priorities. EDCA provides a new channel access method using TXOP. TXOP is a time interval when a particular node has the right to initiate multiple frame exchange sequences onto the wireless medium. A TXOP is defined by a starting time and a maximum duration. The maximum duration is the TXOP limit and is referred to as tTXOP. During a tTXOP, a node transmits one or more MPDUs in a burst, separated by a SIFS. FIG. 3 shows that after a DIFS and backoff time, in response to a busy medium, TXOP is started. The channel access overhead, $O_A$, is shown. Within tTXOP, multiple frames, one of which is labeled as U, may be transmitted. Each frame includes data packets in the MPDU and frame overhead, such as two SIFS, two PHY and an ACK. As shown in FIG. 3 and described in equations 7-9 below, $O_A$, $O_R$ and U for EDCA may be calculated as follows:

$$O_A = tRTS + SIFS + tCTS + (2*O_{PHY}) \quad \text{Equation 7}$$

$$O_R = 0 \quad \text{Equation 8}$$

$$U = tMPDU + (2*SIFS) + tACK + (2*O_{PHY}) \quad \text{Equation 9}$$

If there is no error, given a TXOP limit, tTXOP, the maximum number of frames that can be transmitted is as follows and is applicable to protocols with a tTXOP:

$$N = \left\lfloor \frac{tTXOP - O_A - O_R}{U} \right\rfloor \quad \text{Equation 10}$$

However, there may be error during tTXOP. For EDCA, tTXOP ends if a frame transmission fails.

EBTT for 802.11 EDCA is shown in equation 11 as follows:

$$EBTT = DIFS + tBO + O_A + \left( \sum_{n=0}^{N-1} (n+1)*P(n) + N*P(N) \right)*U + O_R \quad \text{Equation 11}$$

As described above with respect to equation 2, E[n] is an estimation of an average number of frames to be successfully delivered during the burst. P(n) is a probability of successfully delivering n frames in a burst where $0 \leq n \leq N$. N is the maximum number of frames that a protocol transmits in a burst, which may be 1 or greater than 1 based on the protocol. P(n) may be different for different protocols. Equations 12a-14b may be used to calculate P(n) for DCF, EDCA, and EDCA+ and A-MPDU (described below) as follows. In equations 12a-14b, $p_0$ is the probability for success for the RTS/CTS exchange; $P_{round}$ is the probability of success for an MPDU(frame)/ACK exchange; and p is the probability of success for an MPDU(frame) transmission. Equations 12a and 12b are for DCF as follows:

$$P(n) = 1 - (p_{round}*p_0), n=0 \quad \text{Equation 12a}$$

$$P(n) = p_{round}*p_0, n=1=N \quad \text{Equation 12b}$$

Equations 13a-c are for EDCA as follows:

$$P(n) = (1-p_{round})*p_0 + (1-p_0), n=0 \quad \text{Equation 13a}$$

$$P(n) = (p_{round})^n*(1-p_{round})*p_0, 0<n<N \quad \text{Equation 13b}$$

$$P(n) = (p_{round})^N*p_0, n=N \quad \text{Equation 13c}$$

Equations 14a and 14b are for EDCA+ and A-MPDU as follows:

$$P(n) = (1-p)^N*p_0 + (1-p_0), n=0 \quad \text{Equation 14a}$$

$$P(n) = \binom{N}{n}*p^n*(1-p)^{N-n}*p_0, 0<n \leq N \quad \text{Equation 14b}$$

The probabilities P(n) may be used to calculate E[n] in equation 2. Also, P(n) may be used to calculate EBTT. For example, for EDCA, equations 13a-c may be used to calculate EBTT for EDCA, as shown in equation 11.

EDCA+ is EDCA TXOP, shown in FIG. 3, with BACK. BACK is a new selective Automatic Repeat reQuest (ARQ) scheme defined in the 802.11e standard to improve the MAC efficiency. The scheme works as follows: during a tTXOP, a transmitter can send a number of frames, referred to as a block, without receiving any immediate ACK. After all the frame transmissions are completed within the tTXOP, the sender node transmits a BACK Request (BREQ). The receiver node receiving BREQ responds with a BACK.

Figure 4:
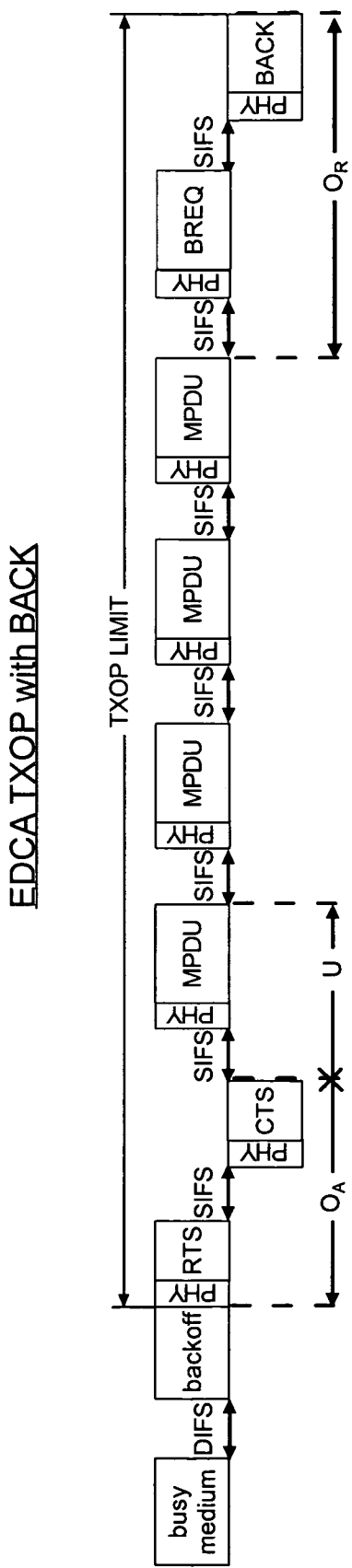
FIG. 4 illustrates a sequence of exchanges for 802.11 EDCA with Block ACK, according to an embodiment.

FIG. 4 illustrates frame exchange sequences using another MAC protocol, 802.11e with EDCA+. FIG. 4 shows the channel access overhead for EDCA+. Note that there is channel access overhead, $O_A$, and channel release overhead, $O_R$. Also, a block of frames may be transmitted with less overhead than EDCA, because there is only a BACK after the block instead of an ACK after each frame. As shown in FIG. 4 and described in equation 15-17 below, $O_A$, $O_R$ and U for EDCA+ may be calculated as follows:

$$O_A = tRTS + SIFS + tCTS + (2*O_{PHY}) \quad \text{Equation 15}$$

$$O_R = tBREQ + 2*SIFS + tBACK + 2*O_{PHY} \quad \text{Equation 16}$$

$$U = tMPDU + SIFS + O_{PHY} \quad \text{Equation 17}$$

EBTT for EDCA+ is described in equation 18 as follows:

$$EBTT = DIFS + tBO + O_A + N*U + O_R \quad \text{Equation 18}$$

In equation 18, N is the number of frames in the block.

Figure 5:
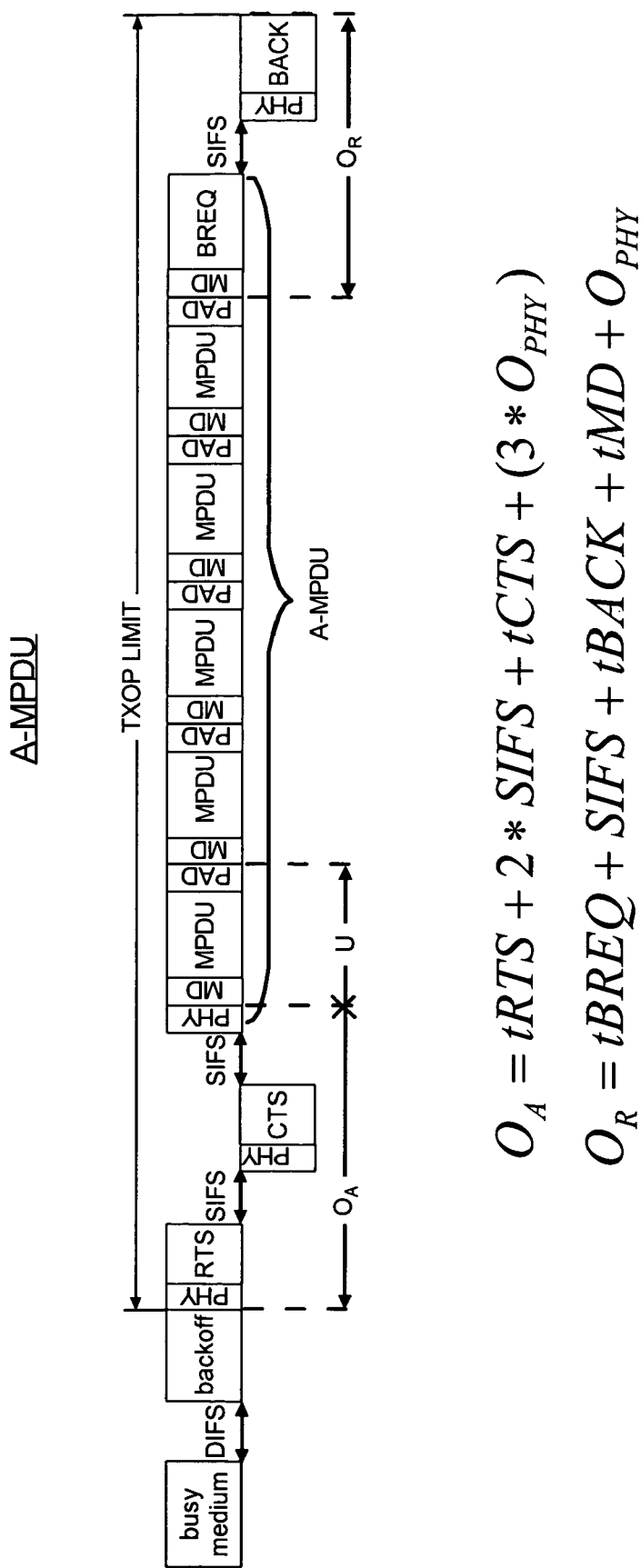
FIG. 5 illustrates a sequence of exchanges for 802.11 aggregate Medium Access Control (MAC) Protocol Data Units (A-MPDU), according to an embodiment.

FIG. 5 illustrates frame exchange sequences using another MAC protocol, 802.11n with A-MPDU. A-MPDU is frame aggregation similar to EDCA+ where a block of frames may be transmitted within tTXOP. When a node using A-MPDU obtains a chance to transmit its frame(s), it searches MAC Service Data Units (MSDUs) that are expected to be transmitted to the same receiver. As illustrated in FIG. 5, an MPDU Delimiter (MD) and padding octets (PAD) are attached in the front and rear (except for a Pad field when it is the last aggregated packet) of an MPDU, respectively, when an A-MPDU is generated. The purpose of the MD is to delimit the MPDUs within the aggregate. The PAD is appended to make each MD+MPDU a multiple of 4 octets in length. The receiving node hence can easily find the next MD when transmission error occurs. Because of the multiple-MPDU aggregation, channel access overhead, such as inter-frame spaces and PHY header/preamble, is reduced, and channel access efficiency is increased. As shown in FIG. 5 and described in equation 19-21 below, $O_A$, $O_R$ and U for A-MPDU may be calculated as follows:

$$O_A = tRTS + 2*SIFS + tCTS + (3*O_{PHY}) \quad \text{Equation 19}$$

$$O_R = tBREQ + SIFS + tBACK + tMD + O_{PHY} \quad \text{Equation 20}$$

$$U = tMPDU + tMD + tPAD \quad \text{Equation 21}$$

EBTT for A-MPDU is the same as EBTT for EDCA+ as described in equation 18.

ECOT is a wireless link metric that may be calculated as a function of EBTT and E[n], such as described with respect to equation 2. EBTT is a function of transmission rate and EBTT changes depending on the protocol being used. Because EBTT takes into consideration transmission rate and various features of the protocol being used, such as the channel overhead and frame transmission time, ECOT may be used as a more accurate metric for routing in a wireless network, such as the WMN 114 shown in FIG. 1, and for finding multihop paths in the WMN 114 with the greatest throughput.

ECOT may improve on-demand routing or conventional routing that relies on predetermined topology. For example, with respect to on-demand routing and FIG. 1, mesh node 110c desires to transmit data from the client 112 to the mesh node 110a. The mesh node 110c floods a route request on the wireless medium. The route request is forwarded until it reaches the destination, which is the mesh node 110a. Intermediate mesh nodes may receive the flooded request and forward the request to the mesh node 110a and include their node ID and ECOT in the forwarded request. Then, the mesh node 110a decides which path to use based on the ECOT for each link in each path. For example, the mesh node 110b compares the ECOTs for a path including 111a and 111f with ECOTs for other paths and selects a path, for example, with the greatest throughput for routing to the mesh node 110a from the mesh node 110c. The mesh node 110a sends a reply via the selected path to the mesh node 110c, and the mesh node 110c sends the data to the mesh node 110a via the selected path. In another embodiment, neighboring mesh nodes may periodically exchange routing information, including ECOTs. Each mesh node builds a table with the ECOTs, and routing is performed based on information in the table in a receiving mesh node.

ECOT is a new wireless network metric, according to an embodiment. ECOT is not limited to its use for routing. Similar to other network metrics, such as latency, hop count, bandwidth, etc., ECOT may be used for other network management functions. Furthermore, ECOT is not limited to its use for WMNS. Generally, ECOT may be used for any type of wireless network, which may include multi-channel wireless networks as well as single-channel wireless networks.

Figure 6:
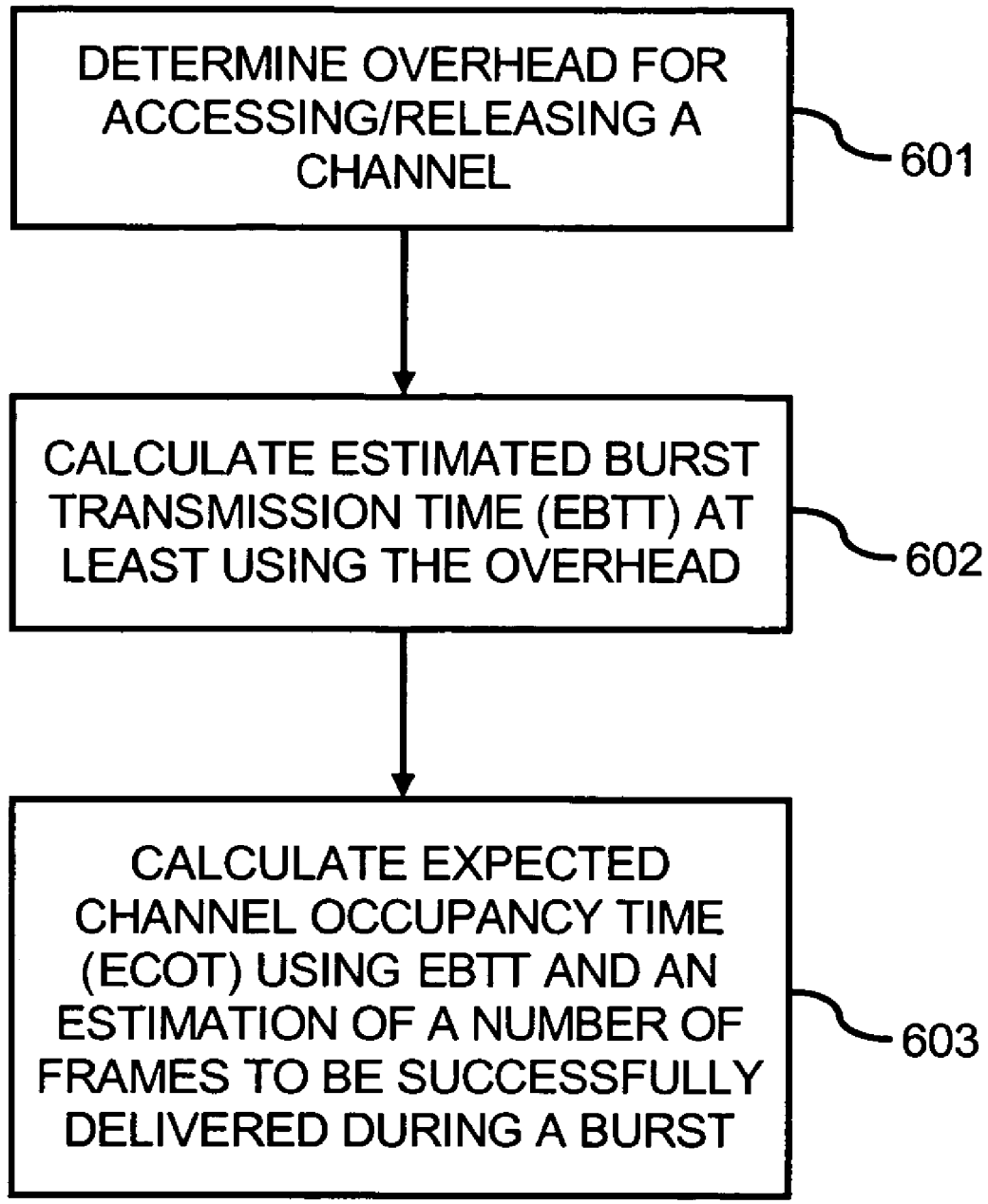
FIG. 6 illustrates a flow chart for determining expected channel occupancy time according to an embodiment.

FIG. 6 illustrates a method 600 for determining ECOT, according to an embodiment. The method 600 is described with respect to FIGS. 1-5 by way of example and not limitation. The method 600 may be performed in systems other than shown in FIG. 1.

At step 601, an overhead for at least one of accessing and releasing a channel to transmit a burst in a wireless network is determined. For example, the mesh node 110c shown in FIG. 1 determines the channel overhead for the protocol being used to transmit the burst. The burst may include one or more frames depending on the protocol and transmission errors. For example, for DCF a burst includes a single frame and for EDCA, EDCA+ and A-MPDU, a burst may include multiple frames.

At step 602, EBTT is calculated based on the overhead. EBTT is a function of channel overhead, $O_A$ and $O_R$, which may change depending on the protocol being used. EBTT is also a function of transmission rate and the amount of time for transmitting a single frame, U, with the protocol being used. U may also vary by protocol. For example, there may be different frame overhead for different protocols or different frame sizes.

At step 603, ECOT is calculated using EBTT and an estimation of a number of frames to be successfully delivered during the burst. The estimation may be based on probabilities of success described above with respect to equations 12a-14b. ECOT may be calculated and used for routing or other network management purposes.

ECOT may vary depending on the protocol being used for wireless transmission in the network. Accordingly, a determination of the protocol to be used for the wireless transmission may be performed prior to determining ECOT. Also, one or more of the steps of the method 600 may be performed by a node, such as one of the mesh nodes in the WMN 114 shown in FIG. 1.

Figure 7:
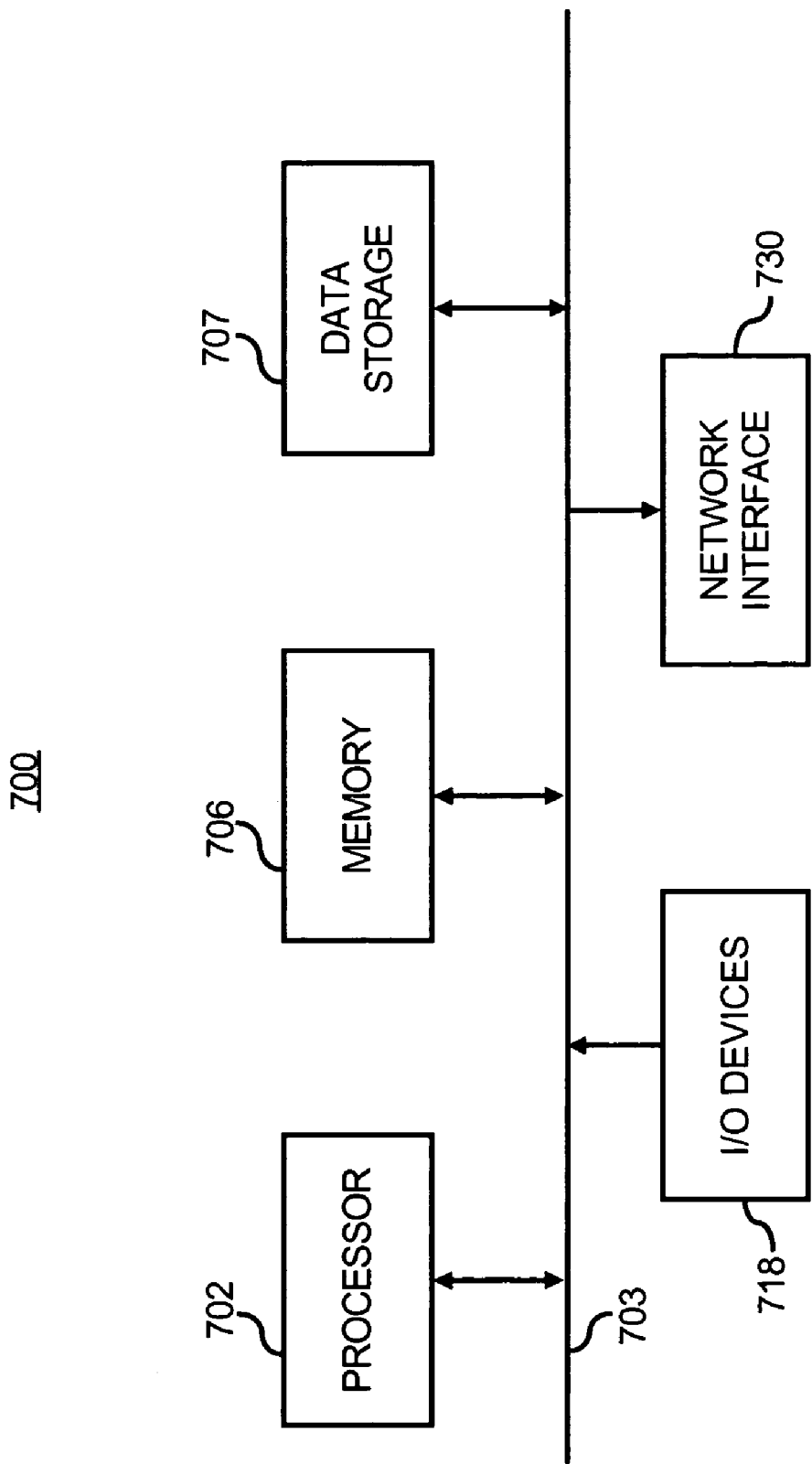
FIG. 7 illustrates a computer system, according to an embodiment.

FIG. 7 illustrates a schematic block diagram of a computer system 700, according to an embodiment. The computer system 700 may include one or more processors, such as processor 702, providing an execution platform for executing software. The computer system 700 also includes a memory 706, which may include Random Access Memory (RAM) where software is resident during runtime. The computer system 700 also includes data storage 707, which may include one or more of ROM (read only memory), EPROM (erasable, programmable ROM), EEPROM (electrically erasable, programmable ROM) hard disks, etc. A bus 703 is also shown.

A user interfaces with the computer system 700 with one or more input/output (I/O) devices 718, such as a keyboard, a mouse, a stylus, a display, and the like. A network interface 730 is provided for communicating with other computer systems. It will be apparent to one of ordinary skill in the art that FIG. 7 is meant to illustrate a generic computer system. Any type of computer system may be used. Furthermore, one or more components of the components of the computer system 700 are optional, such as the display and input devices, and other types of components may be used or substituted as is known in the art.

In one embodiment, the computer system 700 represents a node in a network, which may be a mesh node in the WMN 114. The node may include a router, access point or other device in the network. The network interface 730 may include more than one interface, such as an interface for communicating with clients, an interface for communicating with other mesh nodes and/or an interface for connecting to the Internet if the node is also a gateway portal. The node may not include I/O devices 718. The memory 706 and/or the data storage 707 is operable to store overhead information for a transmission protocol to be used, such as channel overhead and frame overhead, a transmission rate for one or more links, and information regarding an amount of time to transmit a single frame using the protocol. The processor 702 is operable to determine ECOT for a link in a wireless network based on overhead, transmission rate and frame transmission time. The processor 702 may also make routing decisions for on-demand routing or other conventional routing schemes using ECOT for links in the wireless network. For example, the processor 702 may select a path for on-demand routing based on received ECOTs for each link in multiple paths, or a routing table including ECOT for links may be stored and used to select a link for routing.

One or more of the steps of the methods 600 and other steps described herein may be implemented as software embedded or stored on a computer readable medium, such as the memory 706 or data storage 707, and executed by the processor 702. The steps may be embodied by a computer program, which may exist in a variety of forms both active and inactive. For example, there may exist as software program(s) comprised of program instructions in source code, object code, executable code or other formats for performing some of the steps when executed. Any of the above may be stored on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

Those skilled in the art will recognize that variations of the embodiments are possible within the scope as defined in the following claims and their equivalents.

What is claimed is:

1. A method of determining a wireless link metric for routing based on a transmission protocol implemented in a wireless network, the method comprising:
   determining an overhead for at least one of accessing and releasing a channel to transmit a burst, including at least one frame, for the transmission protocol;
   calculating an expected burst transmission time of the burst based at least on the overhead;
   calculating an average expected channel occupancy time to transmit a frame of the burst by dividing the expected burst transmission time with an estimated number of frames to be successfully delivered during the burst; and
   using the expected channel occupancy time as a wireless link metric for routing in the wireless network.

2. The method of claim 1, wherein calculating an expected burst transmission time based at least on the overhead comprises calculating the expected burst transmission time based on the overhead, a transmission rate and an amount of time to transmit a single frame in the burst.

3. The method of claim 1, wherein determining an overhead comprises:
   determining an amount of time to access the channel to transmit the burst using the transmission protocol if the transmission protocol includes overhead for accessing the channel; and
   determining an amount of time to release the channel to transmit the burst using the transmission protocol if the transmission protocol includes overhead for releasing the channel.

4. The method of claim 3, wherein determining an amount of time to access the channel comprises:
   determining an amount of time to transmit physical layer overhead used by the transmission protocol to access the channel;
   determining an amount of time to transmit a request-to-send (RTS) packet and clear-to-send (CTS) packet for the protocol based on a transmission rate and a size of the RTS and CTS packets;
   determining an amount of interframe space used by the protocol to access the channel; and
   determining an average backoff duration for accessing a busy channel using the protocol; and
   summing the determined amount of time to transmit the physical layer overhead, the RTS and CTS packets, the interframe space and the average backoff duration.

5. The method of claim 3, wherein determining an amount of time to release the channel comprises:
   determining an amount of time to transmit physical layer overhead used by the protocol to release the channel;
   determining an amount of time to transmit an acknowledgement request if the protocol uses acknowledgement request;
   determining an amount of time to transmit an acknowledgement if the protocol uses an acknowledgement;
   determining an amount of interframe space used by the protocol to release the channel; and
   summing the determined amount of time to transmit the physical layer overhead, the acknowledgement request, the acknowledgement, and the interframe space.

6. The method of claim 1, wherein calculating an expected burst transmission time comprises:
   calculating the expected burst transmission time based on an amount of time to transmit a single frame in the burst, wherein the single frame includes at least one data packet and frame overhead including at least one of physical layer overhead, interframe space, padding data, and a delimiter.

7. The method of claim 2, further comprising:
   determining a probability for successfully delivering control packets including the overhead;
   determining a probability for successfully delivering a single frame in the burst;
   determining a probability for successfully delivering the at least one frame in the burst if the protocol allows for transmitting multiple frames in a burst; and
   estimating the number of frames to be successfully delivered during the burst based on the determined probabilities for successfully delivering the control packets and the at least one frame.

8. The method of claim 2, wherein calculating an expected burst transmission time comprises:
   determining an amount of time to transmit control packets including the overhead as a function of the transmission rate;
   determining an amount of time to transmit the at least one frame as a function of the transmission rate; and
   summing the amount of time to transmit the control packets including the overhead and the at least one frame.

9. The method of claim 1, wherein the at least one frame comprises data packets and overhead defined by the protocol.

10. The method of claim 1, further comprising:
    identifying the protocol to be used to transmit the at least one frame in the wireless network.

11. The method of claim 1, wherein the wireless network comprises a single channel wireless mesh network.

12. The method of claim 11, wherein the transmission protocol comprises a medium access control transmission protocol.

13. An apparatus operable to determine an expected channel occupancy time metric for a wireless network, the apparatus comprising:
  memory operable to store overhead information for a transmission protocol to be used to transmit a burst including at least one frame on a link in the wireless network and the memory is also operable to store a transmission rate for the link; and
  a processor operable to calculate an expected burst transmission time of the burst to transmit the burst on the link based at least on the overhead and the transmission rate, wherein the processor is also operable to calculate an average expected channel occupancy time to transmit a frame of the burst on the link by dividing the expected burst transmission time with an estimated number of frames to be successfully delivered during the burst.

14. The apparatus of claim 13, wherein the processor is operable to receive an expected channel occupancy time for each of a plurality of links for a plurality of paths in the wireless network between the apparatus and a destination, and is operable to select one of the plurality of paths to transmit data to the destination based on the received expected channel occupancy times.

15. The apparatus of claim 13, wherein the processor is operable to receive and store an expected channel occupancy time for a plurality of links to neighboring nodes in the wireless network, and is operable to select one of the plurality of links to transmit data to a destination based on the stored expected channel occupancy times.

16. The apparatus of claim 13, wherein the wireless network comprises a single channel wireless network and the transmission protocol comprises a medium access control protocol.

17. A tangible computer readable medium storing executable instructions which, when executed by a processor, causes the processor to perform a method of determining a wireless link metric for routing based on a transmission protocol implemented in a wireless network, the method comprising:
  determining an overhead for at least one of accessing and releasing a channel to transmit a burst, including at least one frame, for the transmission protocol;
  calculating an expected burst transmission time of the burst based at least on the overhead;
  calculating an average expected channel occupancy time to transmit a frame of the burst by dividing the expected burst transmission time with an estimated number of frames to be successfully delivered during the burst; and
  using the expected channel occupancy time as a wireless link metric for routing in the wireless network.

18. The computer readable medium of claim 17, wherein calculating an expected burst transmission time based at least on the overhead comprises:
  calculating the expected burst transmission time based on the overhead, a transmission rate and an amount of time to transmit a single frame in the burst.

19. The computer readable medium of claim 17, wherein determining an overhead comprises:
  determining an amount of time to access the channel to transmit the burst using the transmission protocol if the transmission protocol includes overhead for accessing the channel; and
  determining an amount of time to release the channel to transmit the burst using the transmission protocol if the transmission protocol includes overhead for releasing the channel.

* * * * *